United States Patent
Ishikawa et al.

(10) Patent No.: US 10,960,536 B2
(45) Date of Patent: Mar. 30, 2021

(54) MEASUREMENT STATION AND MEASUREMENT METHOD

(71) Applicant: MITUTOYO CORPORATION, Kanagawa (JP)

(72) Inventors: Masahiro Ishikawa, Kanagawa (JP); Yoshitaka Kayaba, Chiba (JP); Go Fukino, Shizuoka (JP); Hirotaka Muramatsu, Shizuoka (JP)

(73) Assignee: MITUTOYO CORPORATION, Kanagawa (JP)

( * ) Notice: Subject to any disclaimer, the term of this patent is extended or adjusted under 35 U.S.C. 154(b) by 212 days.

(21) Appl. No.: 16/208,912

(22) Filed: Dec. 4, 2018

(65) Prior Publication Data

US 2019/0168378 A1 Jun. 6, 2019

(30) Foreign Application Priority Data

Dec. 5, 2017 (JP) .............................. JP2017-233241

(51) Int. Cl.
*B25J 9/00* (2006.01)
*B25J 9/02* (2006.01)
*G01B 5/00* (2006.01)
*G01B 5/008* (2006.01)
*B25J 13/08* (2006.01)
*B25J 18/00* (2006.01)

(52) U.S. Cl.
CPC .............. *B25J 9/02* (2013.01); *B25J 9/0009* (2013.01); *B25J 9/0093* (2013.01); *B25J 9/0096* (2013.01); *B25J 13/088* (2013.01); *G01B 5/0004* (2013.01); *G01B 5/0007* (2013.01); *G01B 5/008* (2013.01); *G01B 5/0016* (2013.01); *B25J 18/00* (2013.01)

(58) Field of Classification Search
CPC . B25J 9/02; B25J 9/0009; B25J 9/0093; B25J 9/0096; B25J 13/088; B25J 18/00; G01B 5/0004; G01B 5/0007; G01B 5/0016
USPC .................................................. 700/245–264
See application file for complete search history.

(56) References Cited

U.S. PATENT DOCUMENTS

| 4,484,293 A | * | 11/1984 | Minucciani | ............ | G01B 21/04 318/568.1 |
| 4,799,170 A | * | 1/1989 | Nakaya | .................. | G01B 7/008 33/504 |
| 5,198,990 A | * | 3/1993 | Farzan | .................. | G01B 21/04 700/195 |
| 7,386,367 B2 | | 6/2008 | Watanabe et al. | | |
| 8,688,264 B2 | * | 4/2014 | Nignon | ..................... | B07C 5/32 700/223 |

(Continued)

FOREIGN PATENT DOCUMENTS

| JP | H11-330204 A | 11/1999 |
| JP | 2004-249391 A | 9/2004 |
| JP | 2015-208791 A | 11/2015 |

*Primary Examiner* — Jaime Figueroa
(74) *Attorney, Agent, or Firm* — Greenblum & Bernstein, P.L.C.

(57) ABSTRACT

A robot arm supporting a workpiece, a support mechanism in a form of a coordinate measuring machine supporting a detector head, and a fixation portion in a form of a contact block fixing the detector head to the workpiece are used to bring the contact block fixed to a table and the workpiece into contact to each other. The detector head measures the workpiece while a relative position of the detector head and the workpiece is fixed.

4 Claims, 11 Drawing Sheets

(56) References Cited

U.S. PATENT DOCUMENTS

| 2004/0162639 | A1* | 8/2004 | Watanabe | B25J 9/1612 |
| | | | | 700/259 |
| 2013/0238129 | A1* | 9/2013 | Rose | B25J 9/1612 |
| | | | | 700/258 |
| 2015/0019013 | A1* | 1/2015 | Rose | B25J 15/10 |
| | | | | 700/258 |

* cited by examiner

MEASUREMENT STATION AND MEASUREMENT METHOD

The entire disclosure of Japanese Patent Application No. 2017-233241 filed Dec. 5, 2017 is expressly incorporated by reference herein.

TECHNICAL FIELD

The present invention relates to a measurement station and a measurement method.

BACKGROUND ART

A measuring machine configured to contact with a workpiece (i.e., a measurement target) is typically used to measure a size, a profile and the like of the workpiece. For instance, a coordinate measuring machine employs a portal-shaped transfer mechanism, which includes columns and a cross bar, to move a detector head (i.e., a probe) relative to a workpiece placed on a table and to bring a contact tip of the detector head into contact with the workpiece (in case of a contact probe) or close to the workpiece (in case of a non-contact probe).

Recently, a measurement station configured to move the detector head or the workpiece using a robot arm has been used.

For instance, the detector head is attached to a multijoint robot arm and the like and is moved to be in contact with or close to the workpiece (see Patent Literature 1: JP 2015-208791 A).

In a measurement station of Patent Literature 1, a position reference member is provided to the robot arm, and a contact detector is provided to a table supporting the workpiece. Before the measurement, the position reference member is brought into contact with or close to the contact detector, thereby calibrating coordinates to get a highly accurate detection position by the detector head.

On the other hand, the robot arm is frequently used for delivering the workpiece. When the workpiece is measured in a course of a production line, the workpiece supported by the robot arm is introduced into a predetermined measuring machine for measurement (see Patent Literature 2: JP 11-330204 A).

Moreover, in order to improve a position accuracy for the robot arm to deliver the workpiece, a posture of the workpiece during the delivery by the robot arm is detected as an image and a delivery position is adjusted (see Patent Literature 3: JP 2004-249391 A).

As disclosed in Patent Literature 2, when the measuring machine measures the workpiece supported by the robot arm, the robot arm introduces the workpiece into the measuring machine and places the workpiece at a measurement position. Then, the robot arm is moved away from the measuring machine while the workpiece remains alone, and the workpiece is measured. After the measurement, the robot arm is returned to the measurement position. While the robot arm holds the measured workpiece, the robot arm removes the workpiece from the measuring machine and transfers the workpiece to a next step.

However, when such operations are conducted, it requires an operation time for holding and releasing the workpiece, so that a tact time cannot be shortened and a working efficiency cannot be improved.

In contrast, as disclosed in Patent Literature 3, it is conceivable that the operations of holding and releasing the workpiece are omitted and the measuring machine measures the workpiece while the robot arm keeps holding the workpiece.

However, a relative position of the workpiece supported by the robot arm to the measuring machine is not stable, which makes it difficult to measure the workpiece at a high accuracy.

On the other hand, when the detector head supported by the robot arm detects a position of the workpiece as disclosed in Patent Literature 1, it is found that vibration of a driving motor of the robot arm and vibration in a form of external disturbance are transmitted to the detector head and detected as a minute noise with respect to the relative position of the detector head to the workpiece, thereby influencing the position accuracy.

It has been known that noises caused by vibration in the same manner as the above are detected also when the workpiece supported by the robot arm is introduced into the measuring machine.

In order to remedy this deficiency, an improvement in the position accuracy has been attempted, for instance, by increasing rigidity of the robot arm. However, even when the rigidity is increased, it is difficult to avoid the transmission of the vibration. Accordingly, a further modification has been demanded.

SUMMARY OF THE INVENTION

An object of the invention is to provide a measurement station and a measurement method which are capable of moving a detector head or a workpiece with a robot arm, improving a working efficiency, and securing a high accuracy.

Another object of the invention is to provide a measurement station and a measurement method which are capable of reducing an influence of vibration transmitted from the robot arm to the detector head or the workpiece while the robot arm supports the detector head or the workpiece.

According to an aspect of the invention, a measurement station includes: a robot arm configured to support one of a workpiece and a detector head; a support mechanism configured to support the other of the workpiece and the detector head; and a fixation portion configured to fix a relative position of the detector head and the workpiece.

In the above aspect of the invention, since the fixation portion fixes the relative position of the detector head and the workpiece, the relative position of the workpiece supported by the robot arm to the detector head becomes stable, so that a highly accurate measurement can be conducted. Moreover, even if vibration is transmitted from the robot arm to the workpiece or the detector head, an influence caused by the vibration is reducible, so that a measurement accuracy of the workpiece using the detector head is improvable.

Herein, the robot arm may be of any types such as an existing multijoint robot (i.e., a vertical multijoint robot), a SCARA robot (i.e., horizontal multijoint robot), a Cartesian coordinate robot and a parallel robot as long as the robot arm is attached with the workpiece or the detector head and is movable to a desired position.

The support mechanism only needs to support one of the workpiece and the detector head movable by the robot arm relative to the other of the measuring detector head and the measured workpiece. As the support mechanism, not only a simple support structure but also an existing coordinate measuring machine and the like are usable.

The fixation portion only needs to fix a relative position of the detector head and the workpiece. For instance, the fixation portion is a component provided to the support mechanism and being capable of contacting with the components of the robot arm (i.e., the robot arm and the workpiece or the detector head supported by the robot arm), or alternatively, a component provided to the robot arm and being capable of contacting with the components of the support mechanism (i.e., the support mechanism and the workpiece or the detector head supported by the support mechanism).

In any arrangement, it is desirable that the workpiece and the detector head (whose relative position is to be fixed) are mutually connected by the shortest path.

In other words, when the fixation portion is provided to the support mechanism, it is preferable that the fixation portion is in direct contact with the workpiece (or the detector head) or in contact with a portion of the robot arm as close as possible to the workpiece (or the detector head). Alternatively, when the fixation portion is provided to the robot arm, it is preferable that the fixation portion is in direct contact with the workpiece (or the detector head) or in contact with a portion of the support mechanism as close as possible to the workpiece (or the detector head).

As is obvious from a function of the detector head, when the detector head is brought into contact with the fixation portion, the detector head is brought into contact with the fixation portion at a case or a connection portion to the robot arm. The fixation portion is in no contact with a measuring portion (e.g., a stylus).

In the measurement station according to the above arrangement, preferably, the fixation portion is provided to the support mechanism supporting the detector head, the robot arm includes fingers to hold the workpiece, and the fingers holding the workpiece are capable of contacting with the fixation portion.

In the above arrangement, since the fingers are in contact with the fixation portion while holding the workpiece, a high accuracy is obtainable due to the fixed relative position of the detector head and the workpiece and vibration is efficiently reducible at the closest position to the workpiece. Further, a direct contact between the workpiece and the fixation portion is avoidable, so that the surface of the workpiece can be protected.

In the measurement station according to the above arrangement, preferably, the support mechanism is a measuring machine including: a table on which a measurement target is to be placed; and a transfer mechanism that is attached with the detector head and allows the detector head to be moved relative to the table, the robot arm is capable of supporting the workpiece and moving the workpiece to a surface of the table, and the fixation portion is provided to the surface of the table and is capable of contacting with the workpiece or the robot arm.

In the above arrangement, an existing robot arm and an existing measuring machine is usable, and the invention is easily implementable by providing the fixation portion on the table.

For instance, an existing coordinate measuring machine, a shape measuring machine, or a profile measuring machine are usable as the measuring machine. The detector head of the above measuring machines is movable to a desired position relative to the table on which the workpiece is placed. When the fixation portion is set at a desired position on a surface of the table, the position can be determined as a fixing position (i.e., the measurement position) of the workpiece.

In the measurement station according to the above arrangement, preferably, the support mechanism is a conveyor on which the workpiece is placed and configured to deliver the workpiece, the robot arm is attached with the detector head and configured to move the detector head to the conveyor, and the fixation portion is provided to the robot arm and is capable of contacting with a surface of the conveyor or the workpiece.

In the above arrangement, an existing robot arm and an existing delivery conveyor are usable, and the invention is easily implementable by providing the fixation portion on the table.

The delivery conveyor may be any existing conveyors such as a belt conveyor configured to place the workpiece at a predetermined distance and a handler conveyor configured to hold an individual workpiece.

According to another aspect of the invention, a measurement method includes: using a robot arm configured to support one of a workpiece and a detector head and a support mechanism configured to support the other of the workpiece and the detector head; bringing the support mechanism or the detector head into contact with the workpiece or the robot arm; and measuring the workpiece using the detector head while a relative position of the detector head and the workpiece is fixed.

In the above aspect of the invention, since the fixation portion fixes the relative position of the detector head and the workpiece, a relative position of the workpiece supported by the robot arm to the detector head becomes stable, so that a highly accurate measurement can be conducted. Moreover, even if vibration is transmitted from the robot arm to the workpiece, an influence caused by the vibration is reducible, so that a measurement accuracy of the workpiece using the detector head is improvable.

The above arrangement can provide the measurement station and the measurement method which are capable of moving the detector head or the workpiece with the robot arm, improving the working efficiency, and securing a high accuracy. Further, the above arrangement can provide the measurement station and the measurement method which are capable of reducing an influence of vibration transmitted from the robot arm to the detector head or the workpiece while the robot arm supports the detector head or the workpiece.

DESCRIPTION OF EMBODIMENT(S)

Exemplary embodiment(s) of the invention will be described in detail below with reference to the attached drawings.

First Exemplary Embodiment

Figure 1:
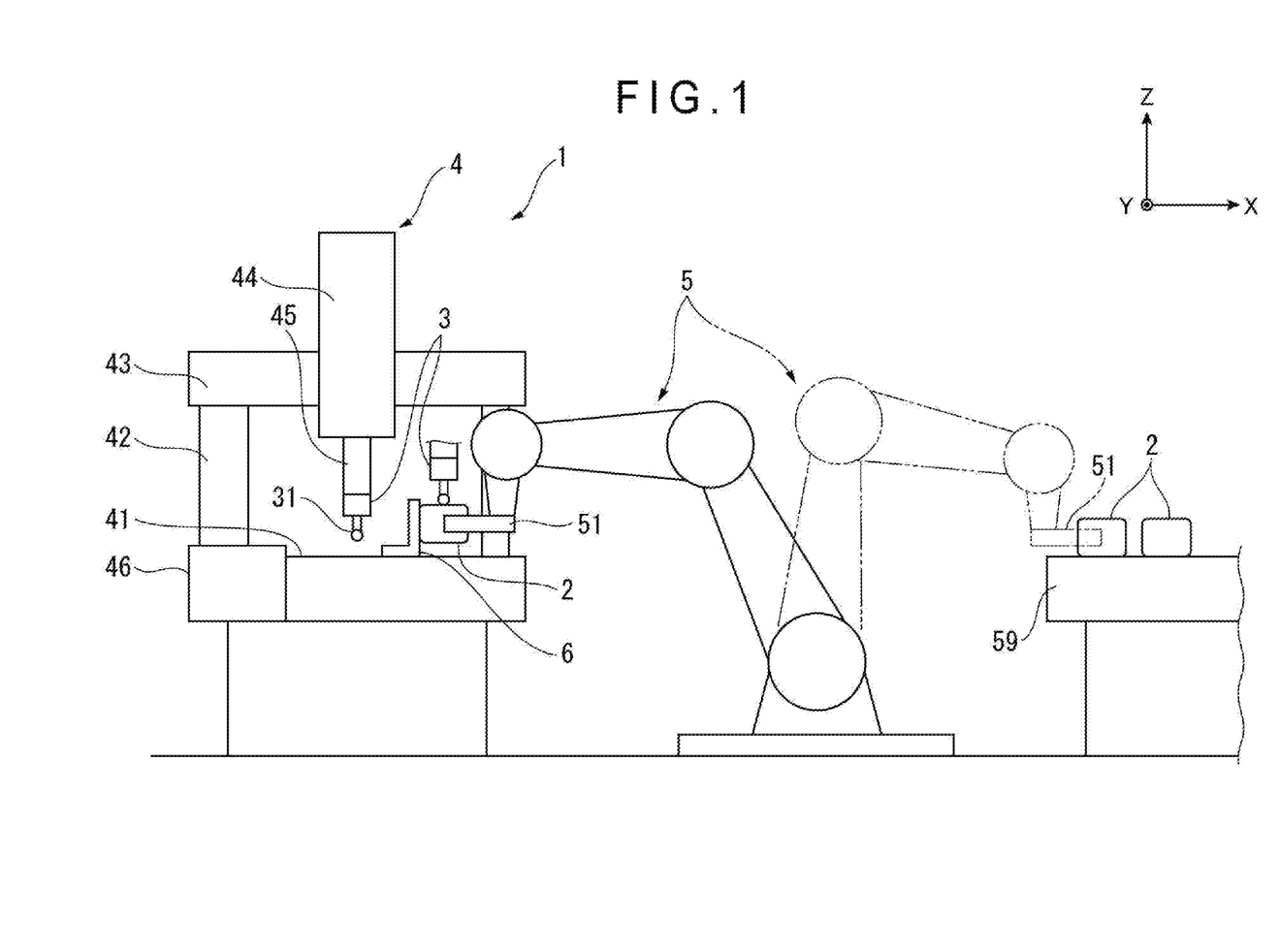
FIG. 1 is a schematic illustration showing an overall structure in a first exemplary embodiment of the invention.

As shown in FIG. 1, a detector head 3 of a measurement station 1 is brought into contact with a workpiece 2 (i.e., a measurement target) to measure coordinates of a contact portion of the workpiece 2 at a high accuracy.

The detector head 3, which is a touch probe (contact probe), is capable of detecting a three-dimensional position of the contact position by bringing a contact tip 31 into contact with a surface of the workpiece 2. The detector head 3 may be a non-contact probe such as a laser probe configured to radiate a laser light on the surface of the workpiece 2 and detect a distance from the surface of the workpiece 2 to a light projection position.

The detector head 3 is attached to a coordinate measuring machine 4 serving as a support mechanism.

The coordinate measuring machine 4 has a table 41 on which the measurement target is usually placed. A pair of columns 42 and a horizontal beam 43 forming a portal are provided on an upper surface of the table 41. A slider 44 slidable along the beam 43 in an X axis direction is supported by the beam 43. A spindle 45 extends downward from the slider 44. The detector head 3 is attached to an end of the spindle 45.

The spindle 45 is movable up and down along the slider 44 in a Z axis direction. The slider 44 is movable along the beam 43 in the X axis direction. The portal structure extending from the columns 42 to the spindle 45 is movable in the Y axis direction, which intersects with the page of FIG. 1, by a transfer mechanism 46 provided to a side surface of the table 41.

Accordingly, the detector head 3 attached to the spindle 45 is three-dimensionally movable relative to the table 41 by the above-described movement along the three axes (i.e., X, Y and Z axes) of the portal structure including the columns 42, so that the detector head 3 can be brought into contact with any point of a surface of the workpiece 2 placed on or above the table 41.

The workpiece 2 is supported on or above the table 41 by a robot arm 5.

The robot arm 5, which is an industrial multijoint robot, includes a pair of fingers 51 that are provided at an end of the robot arm 5 and are capable of clamping the workpiece 2.

A stocker 59 is disposed close to the robot arm 5. The workpiece 2 to be measured is placed on the stocker 59.

The robot arm 5 is configured to clamp the workpiece 2 placed on the stocker 59 with the fingers 51, transfer the clamped workpiece 2 onto the table 41 of the coordinate measuring machine 4, and hold the workpiece 2 at a predetermined position on or above the table 41.

A contact block 6 (a fixation portion) is fixed to the table 41.

Figure 2:
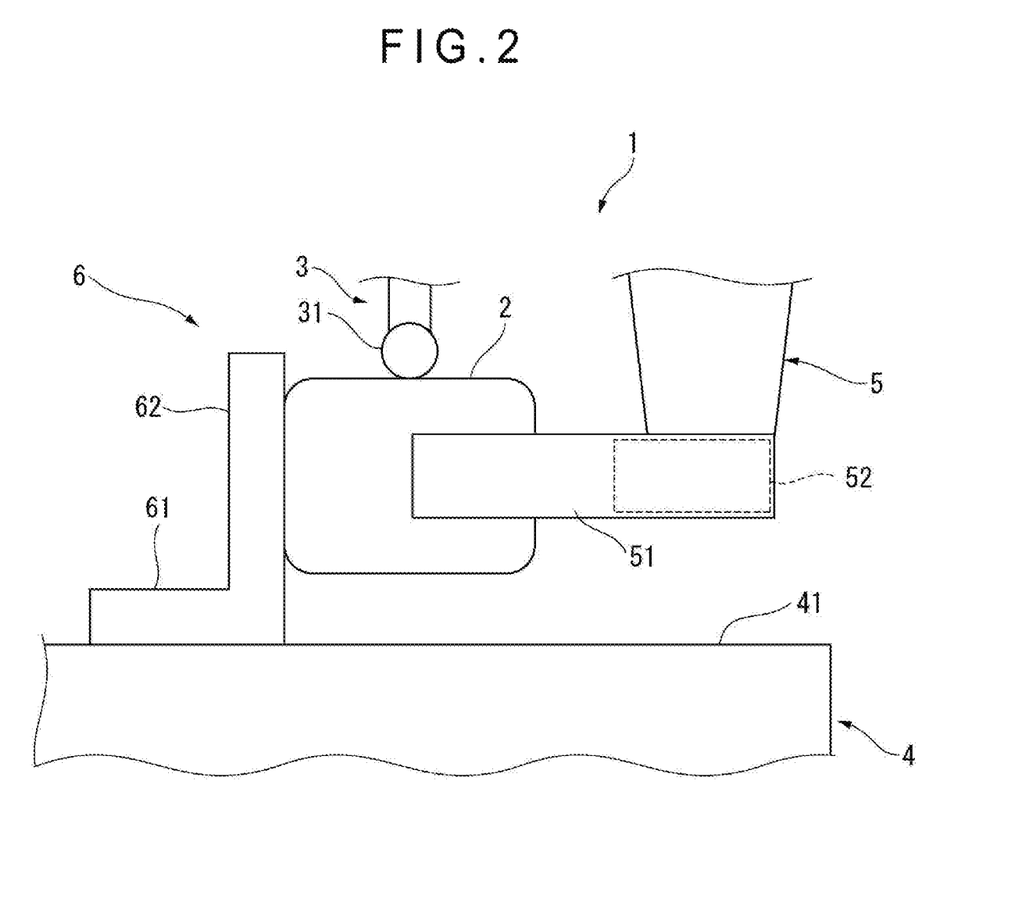
FIG. 2 is a side view showing a measurement state in the first exemplary embodiment.
Figure 3:
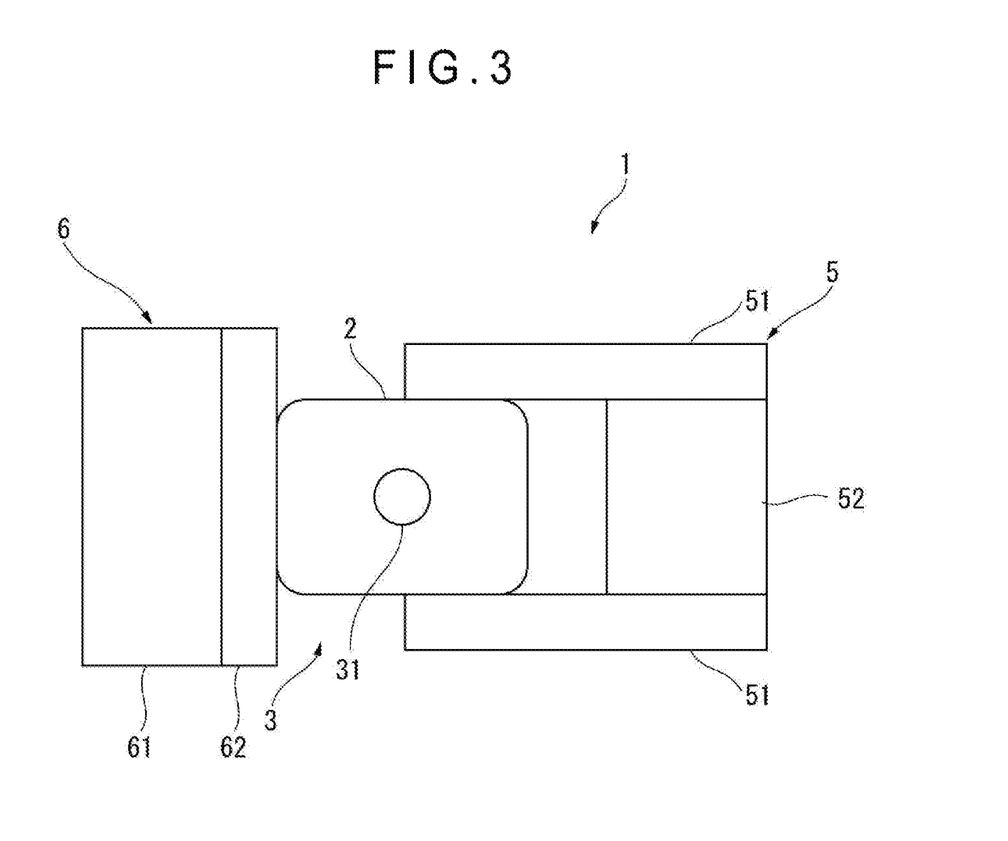
FIG. 3 is a plan view showing the measurement state in the first exemplary embodiment.

FIGS. 2 and 3 show the pair of fingers 51 of the robot arm 5 and the contact block 6 fixed to the table 41.

The pair of fingers 51 are respectively supported on both sides of a body 52 and is drivable by a driving unit (e.g., an air cylinder and an electric motor) installed in the body 52, whereby the fingers 51 are movable toward or away from each other and is capable of clamping the workpiece 2.

The contact block 6 includes: a base 61 fixed to the table 41; and a wall 62 erecting from the base 61. The base 61 and the wall 62 form an L-shape in a side view. The workpiece 2 held by the robot arm 5 can be brought into contact with the wall 62. When the workpiece 2 is in contact with the wall 62, vibration of the workpiece 2 is reduced by the contact block 6.

In order to fix the base 61 to the table 41, a bolt hole formed in advance on the table 41 may be used, or alternatively, an adhesive tape or an adhesive agent may be used.

A measurement procedure of the workpiece 2 in the exemplary embodiment is as follows.

As a preparation for the measurement, the detector head 3 used for the measurement is attached to the coordinate measuring machine 4, and the contact block 6 (the fixation portion) is fixed to the coordinate measuring machine 4. Moreover, the workpiece 2 (the measurement target) is placed on the stocker 59.

In the measurement, the robot arm 5 is directed toward the stocker 59 (in a state shown by a chain line in FIG. 1) and clamps the workpiece 2 with the fingers 51. Next, the robot arm 5 is turned in an opposite direction to be directed toward the coordinate measuring machine 4, and introduces the workpiece 2 on or above the table 41.

At the table 41, the robot arm 5 moves the workpiece 2 to a position facing the contact block 6 and further moves the workpiece 2 toward the contact block 6 at a slow speed to bring a front surface of the workpiece 2 into contact with a surface of the contact block 6 (see FIGS. 2 and 3).

Subsequently, while the workpiece 2 is kept in contact with the contact block 6 by a predetermined force, the coordinate measuring machine 4 is operated to move the detector head 3 to bring the contact tip 31 into contact with the workpiece 2 and detect coordinates of the workpiece 2.

The detection of coordinates is repeated until coordinates at all necessary points of the workpiece 2 are obtained. After the desired detection is finished, the detector head 3 is moved away from the vicinity of the workpiece 2, and the robot arm 5 is again operated to take out the workpiece 2. The workpiece 2 may be delivered to the original position (i.e., the stocker 59) or may be delivered to another stocker and the like.

A series of measurements is conducted as described above with respect to a single workpiece 2.

Next, another workpiece 2 is clamped with the robot arm 5 and measured with the detector head 3 according to the same operation. The same operation is repeated with respect to subsequent workpieces 2. When a series of measurements is conducted with respect to all the workpieces 2, the measurement operation is completed.

The coordinate measuring machine 1 of the first exemplary embodiment achieves the following advantages.

In the exemplary embodiment, the robot arm 5 introduces the workpiece 2 into the coordinate measuring machine 4, and the coordinate measuring machine 4 measures the workpiece 2 kept damped by the robot arm 5. This measurement can eliminate a complicated procedure of placing the workpiece 2, which has been delivered to the coordinate measuring machine 4, to a predetermined position on the table 41 with the robot arm 5, moving the robot arm 5 away from the workpiece 2, subsequently measuring the workpiece 2 with the detector head 3, again introducing the robot arm 5 into the coordinate measuring machine 4, clamping the workpiece 2 with the robot arm 5, and taking out the workpiece 2, so that the working efficiency is improvable.

In the exemplary embodiment, the detector head 3 measures the workpiece 2 kept damped by the robot arm 5. At this time, since the contact block 6 (the fixation portion) fixes the relative position of the detector head 3 and the workpiece 2, a change in the relative position of the detector head 3 and the workpiece 2 can be prevented, so that a highly accurate measurement can be conducted.

Further, even if vibration is transmitted from the robot arm 5 to the workpiece 2, an influence caused by the vibration is reducible, so that a measurement accuracy of the workpiece 2 using the detector head 3 is improvable.

Since the workpiece 2 is to be brought into direct contact with the contact block 6 (the fixation portion), the workpiece 2 can be reliably positioned onto the coordinate measuring machine 4 and vibration of the workpiece 2 can be reliably reduced.

The contact block 6, which has a simple structure consisting of the base 61 and the wall 62, is easily producible. The base 61 allows the contact block 6 to be stably fixed on the table 41 while the erecting wall 62 allows the workpiece 2 to be easily brought into contact with the contact block 6.

Since the contact block 6 (the fixation portion) is fixed to the table 41 of the coordinate measuring machine 4, when a fixing position of the contact block 6 is selected, a position on the table 41, where the detector head 3 detects coordinates of the workpiece 2, can be freely set to a desired position (e.g., an area closest to the robot arm 5 above the table 41).

Since the coordinate measuring machine 4 is used as a support structure, the detector head 3 is inherently attachable to the coordinate measuring machine 4 and the coordinate measuring machine 4 can move the detector head 3 to a desired position while supporting the detector head 3.

In the first exemplary embodiment, the contact block 6 consisting of the base 61 and the wall 62 is used as the fixation portion, and a flat surface of the workpiece 2 is supposed to be brought into contact with the wall 62.

Here, when the surface of the workpiece 2 is spherical, curved, or uneven, a point of the workpiece 2 is in contact with the flat wall 62 to hamper a stable contact between the workpiece 2 and the wall 62, which may not sufficiently reduce the vibration of the workpiece 2.

A differently shaped contact block is usable for the workpiece 2 having the above shape.

Figure 4:
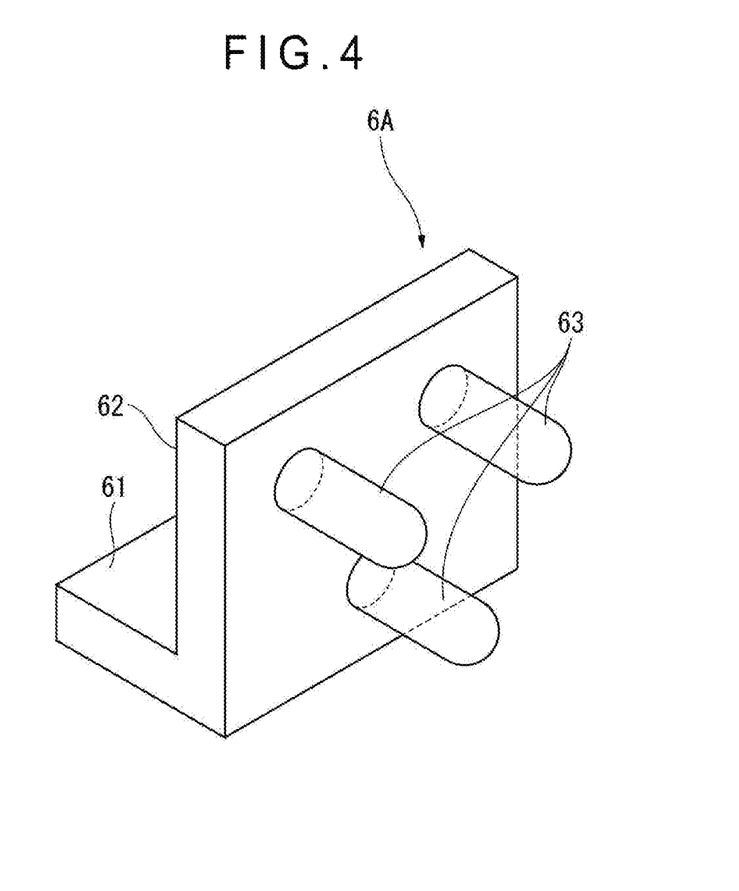
FIG. 4 is a perspective view showing a modification of a fixation portion in the first exemplary embodiment.

As shown in FIG. 4, a contact block 6A includes the base 61 and the wall 62 that are the same as those of the above-described contact block 6 (see FIGS. 2 and 3). Three contact pins 63 are provided on a surface of the wall 62. Accordingly, the workpiece 2 having a spherical, curved or uneven surface can be brought into contact with ends of the three contact pins 63, so that the workpiece 2 can be in a stable contact in the same manner as so-called three-point support.

Second Exemplary Embodiment

Figure 5:
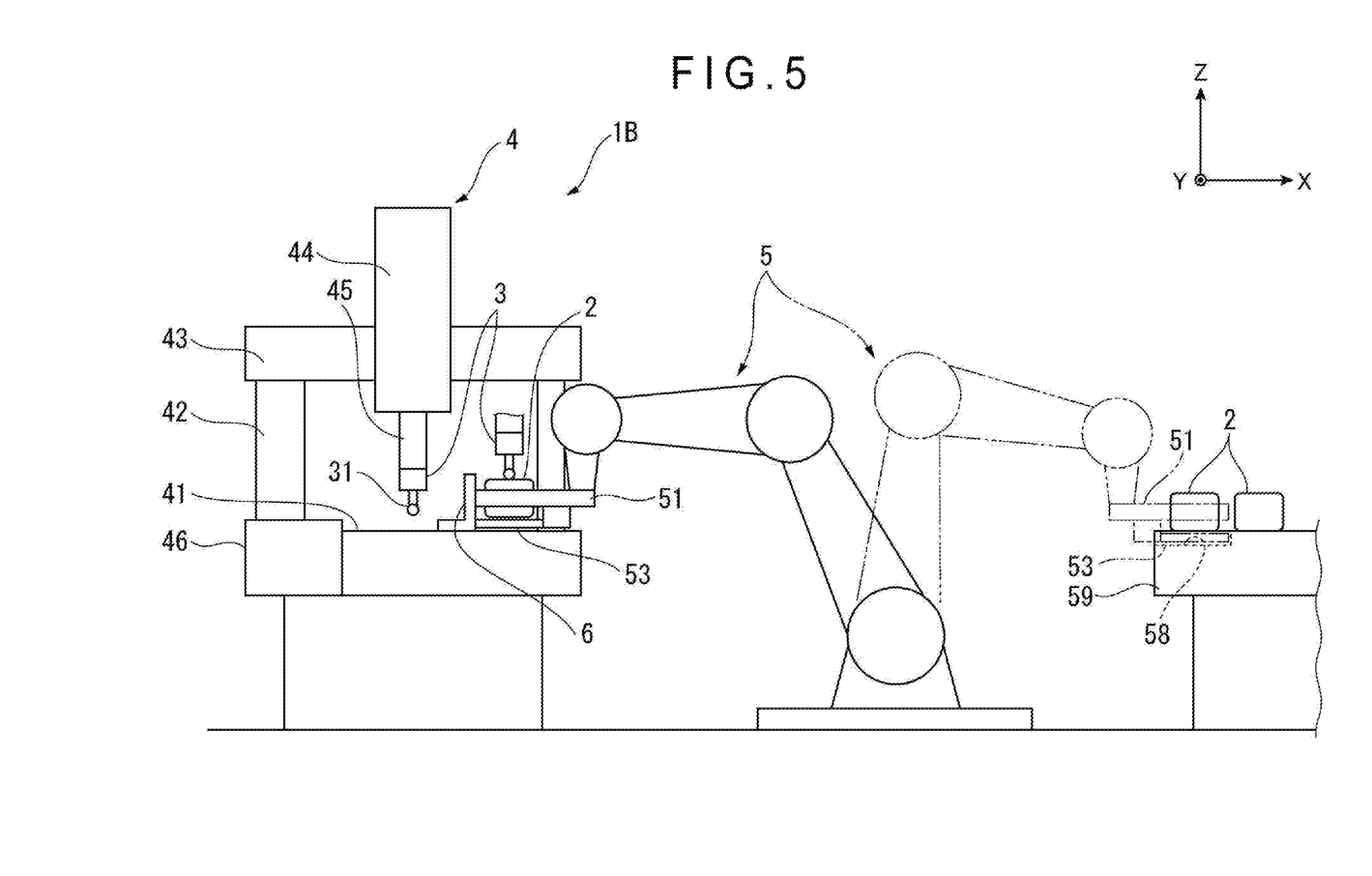
FIG. 5 is a schematic illustration showing an overall structure in a second exemplary embodiment of the invention.
Figure 6:
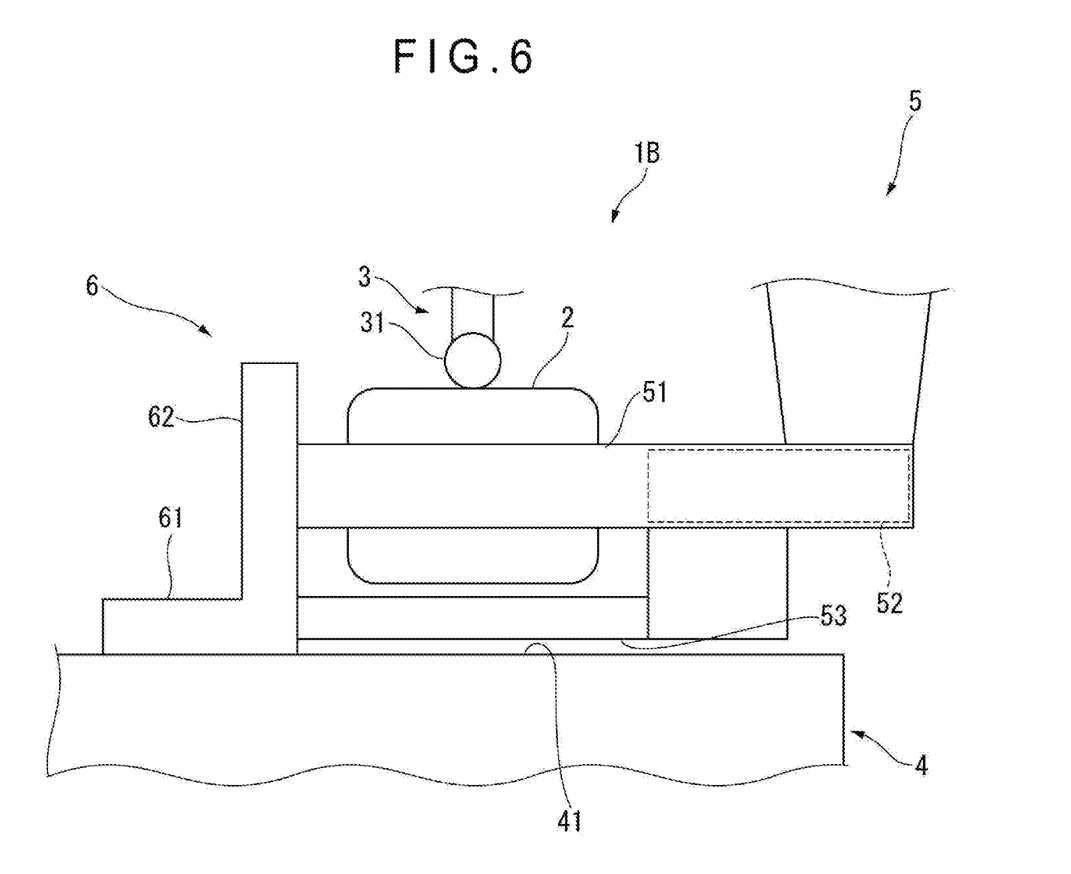
FIG. 6 is a side view showing a measurement state in the second exemplary embodiment.
Figure 7:
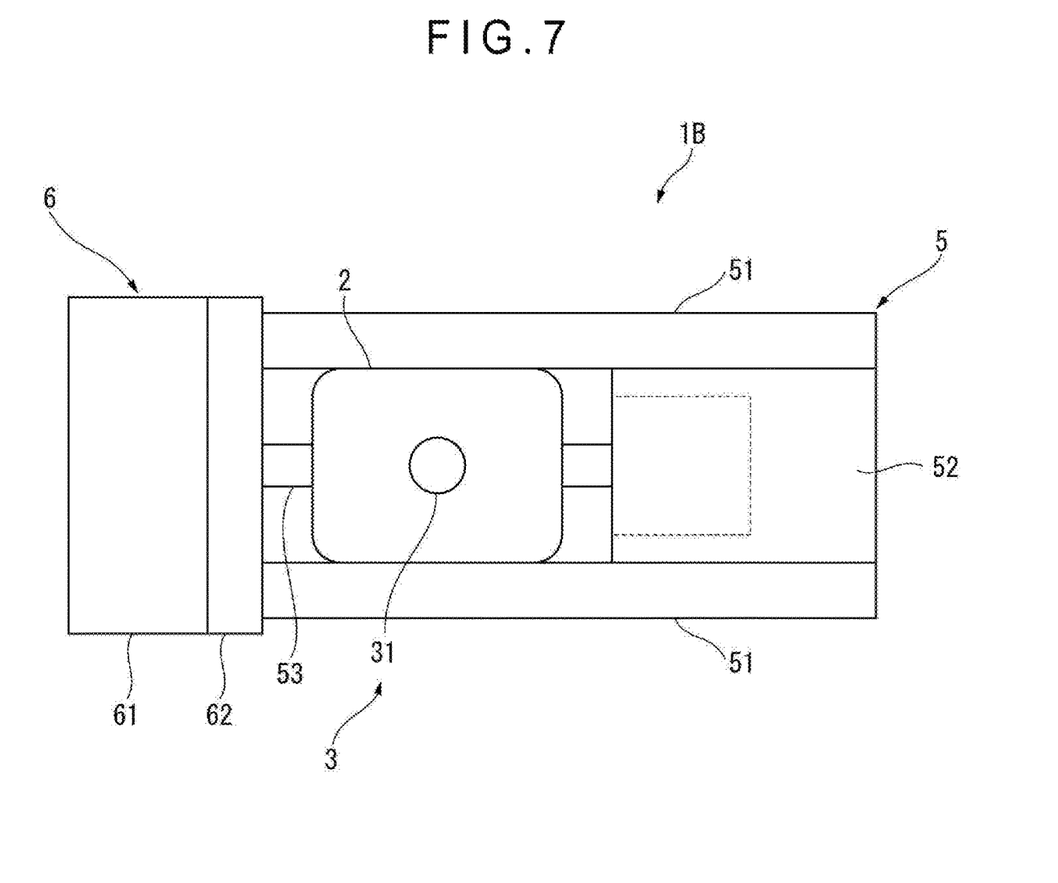
FIG. 7 is a plan view showing the measurement state in the second exemplary embodiment.

FIGS. 5, 6 and 7 show a second exemplary embodiment of the invention.

The second exemplary embodiment is the same as the first exemplary embodiment (see FIGS. 1, 2 and 3) in a basic structure. Accordingly, the description of the common components is omitted and different components are described below.

As shown in FIG. 5, in a measurement station 1B, the detector head 3 is attached to the coordinate measuring machine 4 (the support mechanism) and the contact block 6 (the fixation portion) is fixed to the table 41.

The robot arm 5 is configured to clamp the workpiece 2, which is placed in advance on the stocker 59, with the fingers 51 at the end of the robot arm 5, introduce the workpiece 2 on or above the table 41 of the coordinate measuring machine 4, and hold the workpiece 2 in contact with the contact block 6.

In this state, the coordinate measuring machine 4 is started to move the detector head 3 to be brought into contact with the workpiece 2, so that the detector head 3 can detect coordinates at any surface of the workpiece 2.

In the first exemplary embodiment, the workpiece 2 damped with the fingers 51 is in direct contact with the wall 62 of the contact block 6 (see FIGS. 2 and 3).

As shown in FIGS. 6 and 7, the fingers 51 of the second exemplary embodiment are longer than those of the first exemplary embodiment and project beyond the clamped workpiece 2. Moreover, a contact rod 53 is provided to a lower surface of the body 52. An end of the contact rod 53 and ends of a pair of fingers 51 are flush with a virtual plane.

Accordingly, in the measurement, when the robot arm 5 moves the workpiece 2 toward the contact block 6, the ends of the pair of fingers 51 and the end of the contact rod 53 (three points in total) are brought into contact with the surface of the wall 62, thereby fixing the position of the workpiece 2 relative to the contact block 6 via the fingers 51 and the contact rod 53.

In the second exemplary embodiment, according to the same measurement procedure as in the first exemplary embodiment, the workpiece 2 is introduced into the coordinate measuring machine 4 to be placed at the fixed relative position to the contact block 6 (the fixation portion). In such a fixed state, the detector head 3 is brought into contact with the surface of the workpiece 2 kept damped by the fingers 51, so that the detector head 3 can detect coordinates of the workpiece 2.

Accordingly, the second exemplary embodiment can achieve the same advantages as those of the first exemplary embodiment. Since the fingers 51 are in contact with the contact block 6 while holding the workpiece 2, the position of the workpiece 2 relative to the contact block 6 is fixed at the closest position to the contact block 6, so that vibration is efficiently reducible. Further, a direct contact between the workpiece 2 and the contact block 6 is avoidable, so that the surface of the workpiece 2 can be protected.

In the second exemplary embodiment, since the contact rod 53 is positioned below the lower surface of the workpiece 2, a groove 58 and the like capable of receiving the contact rod 53 therein is desirably formed in the stocker 59. Alternatively, the workpiece 2 may be placed through support bases or the like on the upper surface of the stocker 59 and the contact rod 53 may be inserted into between the support bases.

Third Exemplary Embodiment

Figure 8:
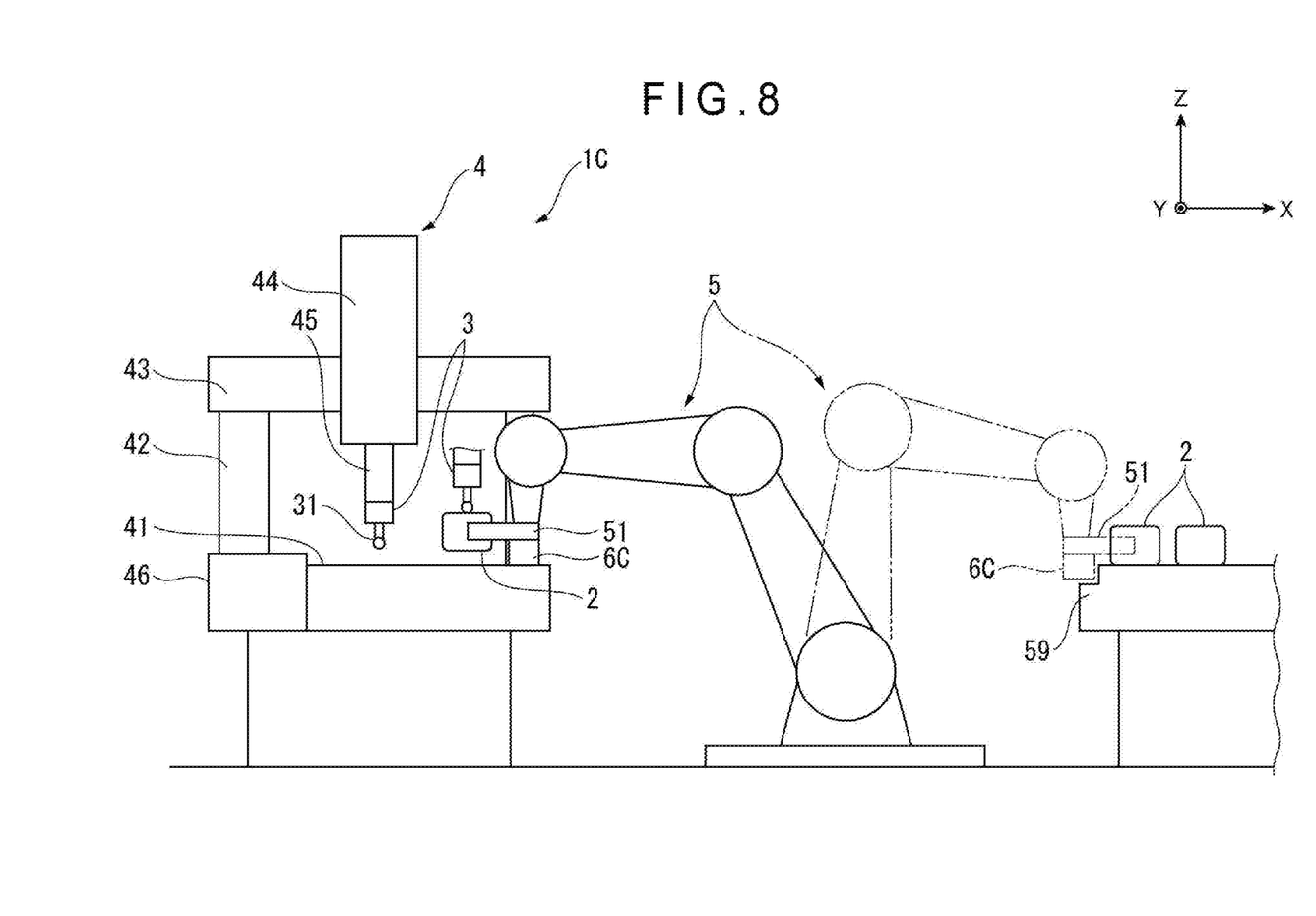
FIG. 8 is a schematic illustration showing an overall structure in a third exemplary embodiment of the invention.
Figure 9:
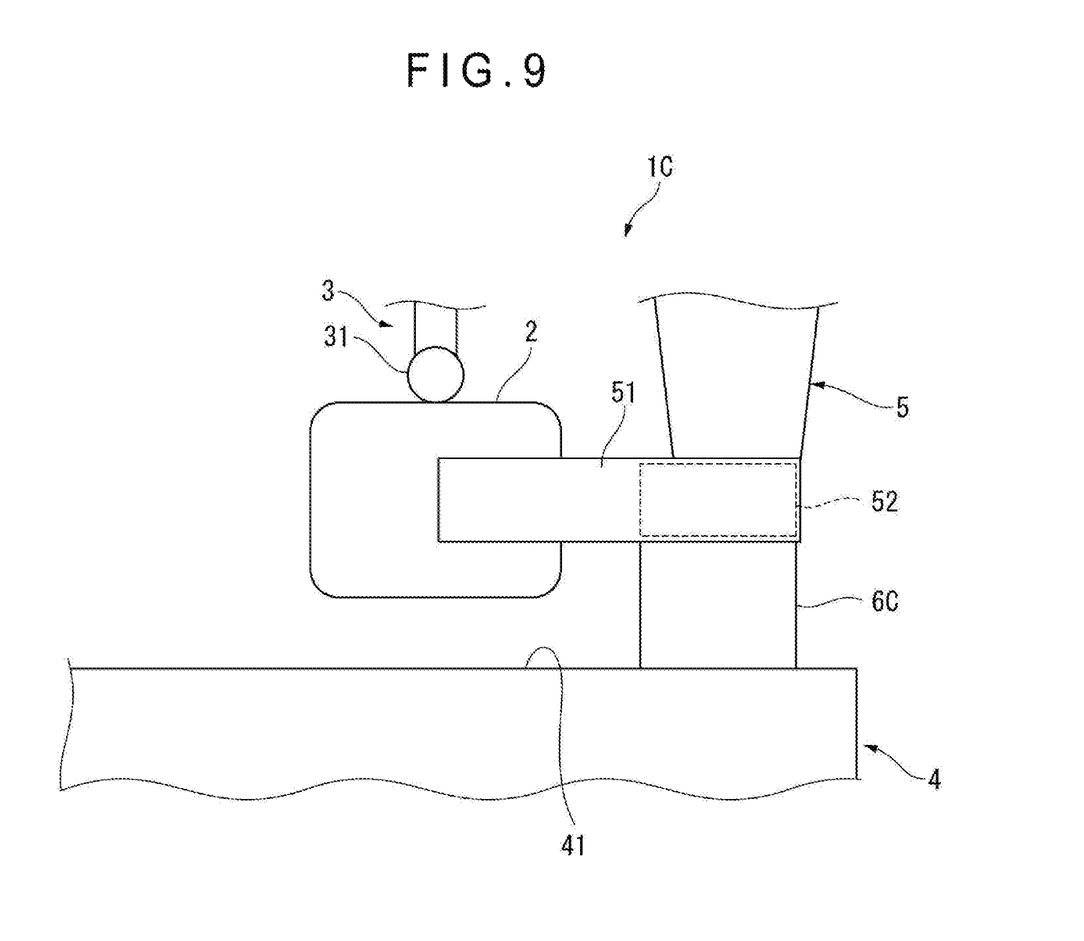
FIG. 9 is a side view showing a measurement state in the third exemplary embodiment.
Figure 10:
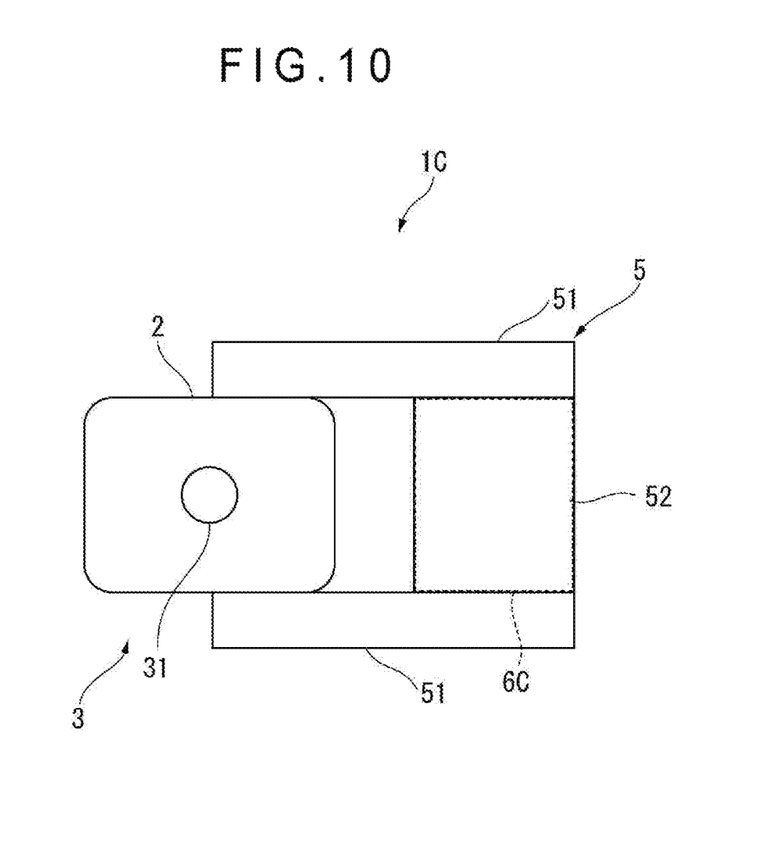
FIG. 10 is a plan view showing the measurement state in the third exemplary embodiment.

FIGS. 8, 9 and 10 show a third exemplary embodiment of the invention.

The third exemplary embodiment is the same as the first exemplary embodiment (see FIGS. 1, 2 and 3) in the basic structure. Accordingly, the description of the common components is omitted and different components are described below.

As shown in FIG. 8, in a measurement station 1C, the detector head 3 is attached to the coordinate measuring machine 4 (the support mechanism).

The robot arm 5 is configured to clamp the workpiece 2, which is placed in advance on the stocker 59, with the fingers 51 at the end of the robot arm 5, and introduce the workpiece 2 to the table 41 of the coordinate measuring machine 4.

In this state, the coordinate measuring machine 4 is started to move the detector head 3 to be brought into contact with the workpiece 2, so that coordinates at any surface of the workpiece 2 can be detected.

In the first exemplary embodiment, the contact block 6 (the fixation portion) is fixed on the table 41, and the workpiece 2 clamped with the fingers 51 is brought into contact with the wall 62 of the contact block 6, thereby fixing the relative position of the workpiece 2 and the contact block 6 (see FIGS. 2 and 3).

As shown in FIGS. 9 and 10, in the third exemplary embodiment, a contact block 6C (the fixation portion) is formed to a lower surface of the body 52.

Accordingly, while the robot arm 5 keeps clamping the workpiece 2, the workpiece 2 is moved above the table 41 and further the contact block 6C is lowered into contact with the table 41, so that the relative position of the workpiece 2 and the table 41 is fixed via the contact block 6C, the body 52 and the fingers 51.

In the third exemplary embodiment, according to the same measurement procedure as in the first exemplary embodiment, the workpiece 2 is introduced into the coordinate measuring machine 4, and the contact block 6C (the fixation portion) is brought into contact with the table 41. In a fixed relative position of the workpiece 2 and the table 41, when the detector head 3 is brought into contact with the surface of the workpiece 2 kept clamped by the fingers 51, the detector head 3 can detect coordinates of the workpiece 2.

Accordingly, the third exemplary embodiment also can achieve the same advantages as those of the first exemplary embodiment.

Further, in the third exemplary embodiment, the workpiece 2 can be measured by the detector head 3 at a desired position on or above the table 41 at any time. Specifically, in the first exemplary embodiment, the contact block 6 needs to be fixed in advance at a suitable position on the table 41 and needs to be moved in order to change the measurement position. In contrast, in the third exemplary embodiment, since the contact block 6 is provided to the robot arm 5, the contact block 6 can be brought into contact with a desired position on the table 41, so that a special operation is not required for changing the measurement position and the working efficiency is improvable.

Fourth Exemplary Embodiment

Figure 11:
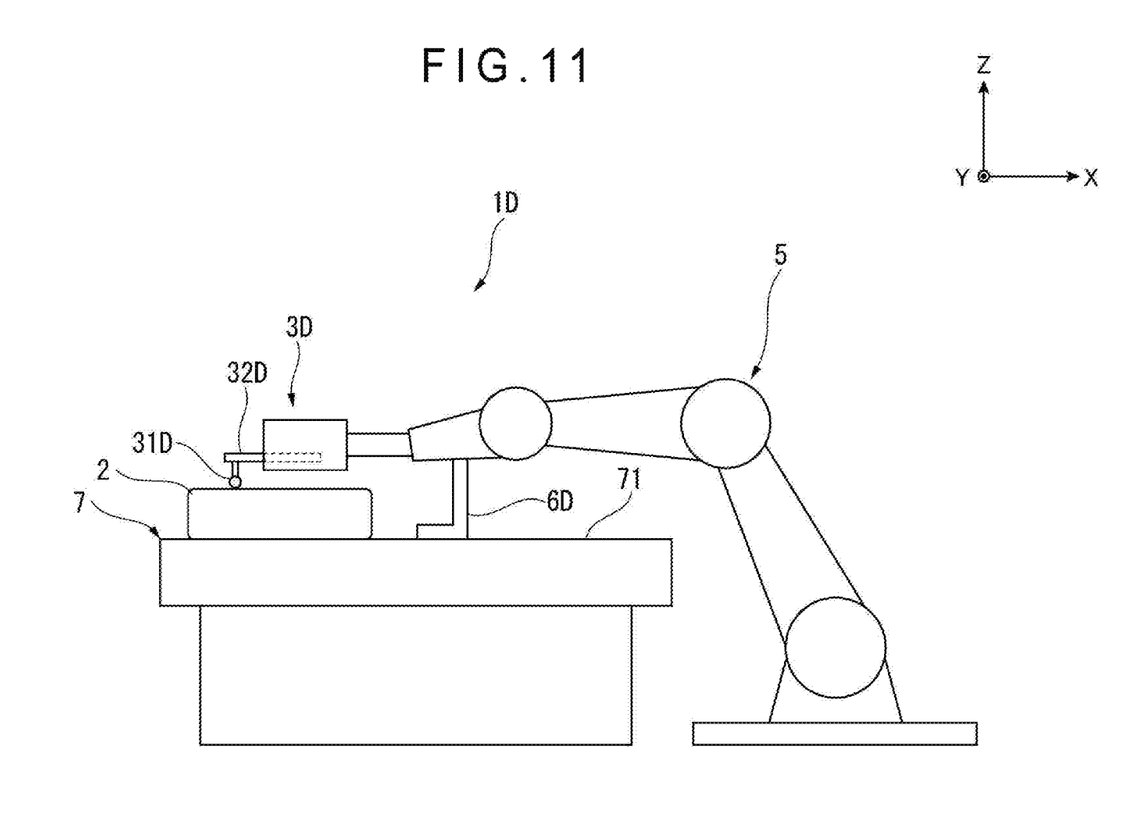
FIG. 11 is a schematic illustration showing an overall structure in a fourth exemplary embodiment of the invention.

FIG. 11 shows a fourth exemplary embodiment of the invention.

In the above first to third exemplary embodiments, the detector head 3 is attached to the coordinate measuring machine 4 serving as the support mechanism and the robot arm 5 clamps the workpiece 2. The contact block 6, 6A (the fixation portion) is fixed to the table 41, or the contact block 6C is provided to the robot arm 5. While the relative position of the table 41 and the workpiece 2 is fixed, the measurement is conducted using the coordinate measuring machine 4 and the detector head 3.

In contrast, in a measurement station 1D of the fourth exemplary embodiment, a delivery conveyor 7 (the support mechanism) is used to hold the workpiece 2 on a workpiece-mounting surface 71. The robot arm 5 is provided along the conveyor 7 and supports a detector head 3D.

The detector head 3D is configured to bring the contact tip 31D at an end of a swing arm 32D into contact with the surface of the workpiece 2 and move the swing arm 32D in a longitudinal direction thereof by an internal driving mechanism while the contact tip 31D is in contact with the workpiece 2, so that a profile and/or roughness of the surface of the workpiece 2 can be measured.

The robot arm 5 supports the detector head 3D and includes a contact rod 6D (the fixation portion) extending downward from a support portion of the detector head 3D.

The contact rod 6D, when being brought into contact with a point of the workpiece-mounting surface 71 close to the workpiece 2, can fix the position of the workpiece 2 placed on the workpiece-mounting surface 71 relative to the detector head 3D supported by the robot arm 5.

In the fourth exemplary embodiment, the workpiece 2 is placed on the workpiece-mounting surface 71 upstream of the conveyor 7 and delivered downstream. When the workpiece 2 being delivered approaches the robot arm 5, the robot arm 5 locates the detector head 3D above the workpiece 2 and moves downward to bring the contact rod 6D into contact with the workpiece-mounting surface 71. Since the relative position of the workpiece 2 and the detector head 3D is fixed in this state, the detector head 3D is operated to measure the surface of the workpiece 2.

In this arrangement of the fourth exemplary embodiment, since the workpiece 2 is delivered by the conveyor 7, an operation of clamping the workpiece 2 with the robot arm 5 and unclamping the workpiece 2 from the robot arm 5 is not required and a time for such an operation is not required, so that the working efficiency is improvable.

Further, the surface of the workpiece 2 can be measured by the detector head 3D while the relative position of the workpiece 2 and the detector head 3D is fixed, thereby achieving a highly accurate measurement at the fixed relative position of the workpiece 2 and the detector head 3D, and an influence of vibration transmitted from the robot arm 5 to the detector head 3D is reducible.

Other Exemplary Embodiment(s)

The invention is not limited to the exemplary embodiments but may include any modifications and the like not hampering the achievement of an object of the invention.

In the first to third exemplary embodiments, an existing multijoint robot (a vertical multijoint robot) is used as the robot arm 5. However, in some embodiments, for instance, a robot arm in other types such as a SCARA robot (i.e., horizontal multijoint robot), a Cartesian coordinate robot and a parallel robot is usable as needed as long as the robot arm is attached with the workpiece 2 or the detector head 3 and is movable to a desired position.

The support mechanism is in the form of the coordinate measuring machine 4 in the first to third exemplary embodiments and in the form of the conveyor 7 in the fourth exemplary embodiment. However, in some embodiments, for instance, the support mechanism is in the form of other measuring machines and delivering devices. The support mechanism only needs to support one of the workpiece 2 and the detector head 3 which is movable by the robot arm 5 relative to the other of the measuring detector head 3 and the measured workpiece 2. The support mechanism is not limited to the measuring machine, however, in some embodiments, for instance, the support mechanism is a support structure.

In the above exemplary embodiments, the detector head 3, 3D in the form of a touch probe (contact probe) detects a three-dimensional position of the contact position by the contact tip 31, 31D contacting with the surface of the workpiece 2. However, in some embodiments, for instance, the detector head of the invention is in the form of a non-contact probe such as a laser probe configured to radiate a laser light on the surface of the workpiece and detect a distance from the surface of the workpiece to a light projection position.

In the first and second exemplary embodiments, the contact block 6, 6A is used as the fixation portion to be fixed to the table 41. In the third and fourth exemplary embodiments, the contact block 6C or the contact rod 6D provided to the robot arm 5 is used as the fixation portion. The fixation portion is not limited to the above components, but only needs to fix the relative position of the detector head 3, 3D and the workpiece 2. For instance, in some embodiments, the fixation portion is a component provided to the support mechanism and being capable of contacting with the components of the robot arm (i.e., the robot arm 5, and the workpiece 2 or the detector head 3, 3D supported by the robot arm 5), or alternatively, a component provided to the robot arm 5 and being capable of contacting with the components of the support mechanism (i.e., the support mechanism such as the coordinate measuring machine 4 and the conveyor 7, and the workpiece 2 or the detector head 3 supported by the support mechanism).

In any arrangement, it is desirable that the workpiece 2 and the detector head 3 (whose relative position is to be fixed) are mutually connected by the shortest path.

What is claimed is:

1. A measurement station comprising:
    a robot arm configured to support a workpiece;
    a support configured to support a detector head, the support comprising:
        a table on which a measurement target is to be placed, and
        a transfer mechanism that is attached to the detector head; and
    a fixation portion configured to fix a relative position of the detector head and the workpiece, wherein:
    the robot arm is configured to one of:
        bring the supported workpiece into contact with the fixation portion, and
        when fingers or a contact rod are provided to a body provided at an end of the robot arm, bring one of the fingers and the contact rod into contact with the fixation portion, and
    the transfer mechanism moves the detector head relative to the table while the supported workpiece, the fingers, or the contact rod are in contact with the fixation portion.

2. The measurement station according to claim 1, wherein the robot arm comprises the fingers to hold the workpiece, and
    the robot arm is configured to bring the fingers holding the workpiece into contact with the fixation portion.

3. A measurement station comprising:
    a robot arm configured to support a detector head;
    a conveyor separated from the robot arm and configured to support a workpiece; and
    a fixation portion provided to a support and configured to fix a relative position of the detector head and the workpiece, wherein:
    the conveyor is configured to accept the workpiece thereon, and is further configured to deliver the workpiece,
    the support is configured to support the detector head of the robot arm, and
    the robot arm is configured to bring the fixation portion into contact with a surface of one of the conveyer or the workpiece, and move the detector head relative to the workpiece while keeping the fixation portion in contact with the surface of one of the conveyor or the workpiece.

4. A measurement method comprising:
    using a measurement station including:
        a robot arm configured to support a workpiece; and
        a support configured to support a detector head, the support including:
            a table provided with a fixation portion on a surface, and
            a transfer mechanism that is attached with the detector head;
    fixing, using the fixation portion, a relative position of the detector head and the workpiece;
    using the robot arm, bringing one of:
        the supported workpiece into contact with the fixation portion, and
        when fingers or a contact rod are provided to a body provided at an end of the robot arm, one of the fingers and the contact rod into contact with the fixation portion; and
    moving, using the transfer mechanism, the detector head relative to the table while one of the supported workpiece, the fingers, or the contact rod are in contact with the fixation portion.

* * * * *